United States Patent [19]
De Taffin et al.

[11] 3,985,691
[45] Oct. 12, 1976

[54] PARTICULATE NITROCELLULOSE COMPOSITION

[75] Inventors: Francois De Taffin; Jacques Plazanet, both of Bergerac, France

[73] Assignee: Societe Nationale des Poudres et Explosifs, France

[22] Filed: Aug. 12, 1974

[21] Appl. No.: 496,694

Related U.S. Application Data

[62] Division of Ser. No. 360,770, May 16, 1973, abandoned.

[30] Foreign Application Priority Data

May 17, 1972  France .............................. 72.17682

[52] U.S. Cl. ................................................. 260/13
[51] Int. Cl.² ..................... C08L 75/06; C08L 1/18
[58] Field of Search .............. 260/13; 106/182, 170, 106/171, 195

[56] References Cited
UNITED STATES PATENTS

| | | | |
|---|---|---|---|
| 1,612,669 | 12/1926 | Van Schaak .................... | 106/182 X |
| 1,927,539 | 9/1933 | Bogin .................................... | 134/79 |
| 2,169,200 | 8/1939 | Uhler ..................................... | 91/68 |
| 2,344,708 | 3/1944 | Lasher ................... | 106/171 |
| 2,389,940 | 11/1945 | Speicher ............................ | 106/169 |
| 2,510,834 | 6/1950 | Phillips ............................. | 106/170 |
| 2,843,582 | 7/1958 | Voris ................................. | 260/223 |
| 3,236,702 | 2/1966 | Sapiego ................................... | 149/2 |
| 3,763,061 | 10/1973 | Lewis et al. ........................... | 260/13 |

OTHER PUBLICATIONS

Gordon and Dolgin, "Surface Coatings," Chemical Publishing Co., 1954 pp. 116–119.
Yamada et al., "Nitrocellulose Lacquer Compositions" Chemical Abstracts 74, 65,681v (1971).

*Primary Examiner*—Donald E. Czaja
*Assistant Examiner*—E. A. Nielsen
*Attorney, Agent, or Firm*—Bucknam and Archer

[57] ABSTRACT

A new particulate nitrocellulose composition comprises nitrocellulose and 10 – 30% by weight of a hydroxylic plasticizer containing at least one free hydroxyl group. A protective water-soluble colloid is used to prepare the compositions. The compositions are particularly valuable for the manufacture of polyurethane lacquers, and improve the resistance of the lacquers to solvents and to migration of plasticizers.

3 Claims, No Drawings

PARTICULATE NITROCELLULOSE COMPOSITION

This is a division of application Ser. No. 360,770 filed May 16, 1973 now abandoned.

This invention relates to particulate nitrocellulose compositions.

Nitrocellulose has been used for a long time as a film former for the production of thin coatings (paints and lacquers) when the properties required of the coatings are low retention of solvent and rapid drying. There is, however, an increasing demand for organic coatings which are insensitive to common solvents and conventional coatings based on pure nitrocellulose are generally sensitive to solvents and this is a great disadvantage in many applications (for example, in industrial paints).

Industrial nitrocelluloses containing free hydroxyl functional groups have previously been used to change the mechanical properties and the drying properties of polyurethane lacquers. However, nitrocellulose is available commercially only in a form wetted with alcohol or combined with plasticisers, such as butyl phthalate, which it is desired to remove from the nitrocellulose before using the latter. Any alcohol present in the nitrocellulose reacts with the isocyanate groups of polyurethane lacquers and prevents crosslinking of these lacquers, and any plasticisers present have a strong tendency to sweat.

We have now developed a new industrial nitrocellulose composition, which is especially useful for the manufacture of polyurethane lacquers and makes it possible, among other things, to improve the resistance to solvents and to migration of plasticisers of these lacquers. For this purpose, the new nitrocellulose composition according to the invention contains a hydroxylic plasticiser with at least one free hydroxyl group which is capable of reacting with isocyanate polyurethane; the nitrocellulose composition is in the form of dry particles. Such a plasticiser is used in the proportion of 10 to 30%, and preferably 15 to 25%, by weight relative to nitrocellulose.

Thus, according to the invention, we provide a particulate nitrocellulose composition which comprises nitrocellulose and from 10 to 30% by weight, based on the weight of nitrocellulose, of a hydroxylic plasticiser containing at least one free hydroxyl group. The hydroxylic plasticiser plays a double role: firstly, it serves to make the nitrocellulose more stable for transporting and handling and, secondly, it acts simultaneously as a plasticiser and as a hydroxylic reagent in the formation of polyurethane lacquers.

Preferred hydroxylic plasticisers include for example:

a. lower alkyl esters of carboxylic hydroxyacids, preferably of lactic acid, tartaric acid or citric acid, particularly preferred esters being butyl lactate, dibutyl or di-amyl tartrate and tri-butyl citrate, and b. triglycerides of hydroxylic fatty acids, and in particular castor oil.

As used herein the term "lower alkyl" refers to those alkyl groups having up to 6 carbon atoms.

Any type of industrial nitrocellulose with a nitrogen content of 10.8 to 12.6% can be used in the composition according to the invention. For example, depending on the hydroxyl number desired in the final product, it is possible to use either a so-called alcohol-soluble nitrocellulose, with a nitrogen content of about 11% or a nitrocellulose containing few free hydroxyl groups, and which is therefore soluble in esters, with a nitrogen content of about 12%.

Nitrocellulose of various viscosities may be used to form the composition of the invention; nitrocelluloses of the low viscosity type lead to harder products than nitrocelluloses of the high viscosity type.

In order to prepare the composition according to the invention, the following are brought into contact with one another:

a. a solution of the hydroxylic plasticiser in a common solvent for the plasticiser and the nitrocellulose, b. a dispersion of nitrocellulose in a mixture of water and the said common solvent in the presence of a protective colloid, such the proportion by weight of the hydroxylic plasticiser is 10 to 30%, preferably 15 to 25% based on the weight of the nitrocellulose, and c. the particles of nitrocellulose containing the hydroxylic plasticiser thus formed, are separated.

The protective colloids are chosen according to the size of the granules desired. Thus polyvinyl alcohol leads to finer granules than carboxymethylcellulose and methyl-cellulose. These protective colloids must be soluble in water.

The amount of colloid to be used may, for example, be from 0.1 to 3% by weight based on the weight of the nitrocellulose employed.

Any liquid organic solvent for nitrocellulose can be employed and is employed in an amount sufficient to obtain a true dispersion of the nitrocellulose. The preferred solvents have a boiling point below that of water or give an azeotrope with the latter. For example, the solvent may be ethyl acetate, isopropyl acetate, butyl acetate, methyl ethyl ketone or methyl propyl ketone.

In order that the invention may be more fully understood, the following Examples are given by way of illustration only.

EXAMPLE 1

400 g (dry weight) of ester-soluble nitrocellulose, type CA. 4 E 32, containing 12% of nitrogen, of low viscosity and previously wetted with water, were introduced into a 4 liter glass reactor. The nitrocellulose commercially marketed under the name CA4E32 is a nitrocellulose soluble in esters containing 12% nitrogen; of a molecular weight based on the anhydroglucose unit of 263.7; having 2.8 hydroxyl groups per kg of dry material; having 2.26° of substitution; and absolute viscosity of 80 CP when a solution of 10 grams of material is dissolved in 100 grams of butyl acetate, with the absolute viscosity being measured at 20° C. A solution of 5.6 g of carboxymethyl-cellulose in 400 cm³ of hot water, 1.5 liters of water and 700 g of ethyl acetate were added to the nitrocellulose. The mixture was stirred slowly at ambient temperature for one fourth hour.

100 g of di-butyl tartrate (plasticiser) dissolved in 380 g of ethyl acetate were then slowly poured into the mixture.

The mixture was heated on a water bath, with stirring, and then, after one fourth hour, the water/ethyl acetate azeotrope was distilled off at 72° C. The distillation temperature was finally raised to 89° C. The mixture was cooled whilst continuing to stir, and the particles formed were filtered off on sintered glass (porosity No. 1); they were washed and dried in an oven at 85° C. The yield was about 92%. The particles were very fine, of average size less than 200 microns, and contained 18% of plasticiser.

EXAMPLE 2

The process described in Example 1 was repeated, but the di-butyl tartrate was replaced by 100 g of tri-butyl citrate (plasticiser). Particles of satisfactory average size, less than 200 microns, containing 18% of plasticiser, were obtained in a yield of 94%.

EXAMPLE 3

The process described in Example 1 was repeated, but the following ingredients were employed: Nitrocellulose type CA 4E24 containing

| | |
|---|---|
| 12% of nitrogen | 200 g |
| butyl lactate (plasticiser) | 44 g |
| ethyl acetate | 540 g |
| water | 980 g |
| polyvinyl alcohol (protective colloid) | 3 g |

The nitrocellulose commercially marketed under the name CA4E24 is a nitrocellulose soluble in esters having 12% nitrogen content; of molecular weight 263.7 based on the anhydroglucose unit, having 2.26 degree of substitution and 38 CP absolute viscosity at 20°C for a solution of 10 grams of material in 100 grams of butyl acetate.

Particles of average size 200 $\mu$, containing 18% of plasticiser, were obtained in a yield of 95%.

EXAMPLE 4

The process described in Example 1 was repeated, but the di-butyl tartrate was replaced by 100 g of castor oil (plasticiser).

Particles of average size 200 $\mu$, containing 18% of plasticiser, were obtained with a yield of 93%.

Comparable results were obtained when the castor oil in Example 4 was replaced by a triglyceride of hydroxylic fatty acids, with a hydroxyl number of 150 to 160 ("Alkydal F 251" produced by Bayer, Synthese or "Setal 84" produced by Bayer, Syntheses).

The nitrocellulose/plasticiser particles according to the invention have numerous applications, including those of the already known nitrocellulose granules. The low moisture content of the compositions of the invention makes them particularly valuable for the manufacture of polyurethane lacquers.

Polyurethane lacquers comprising the nitrocellulose compositions of the invention combine the desired characteristics of nitrocellulosic binders (such as low retention of solvent and rapid drying with the properties of polyurethane binders such as gloss and good resistance to solvents and to abrasion).

The use of the nitrocellulose/plasticiser particles of the invention in these lacquers also makes it possible to improve their resistance to solvents and to the migration of plasticisers.

The results of the tests which follow demonstrate such an improvement.

TESTS OF IMPROVEMENT IN THE RESISTANCE TO SOLVENTS AND TO MIGRATION OF SOME HYDROXYLIC PLASTICISERS IN MIXED NITROCELLULOSE/POLYURETHANE LACQUERS

Lacquer formulations (by weight)

| | Plasticiser | | | |
|---|---|---|---|---|
| | Control D.B.P. (di-butyl phthalate | Butyl lactate | Tri-butyl citrate | Di-butyl tartrate |
| Particles of nitrocellulose type CA.4.E 32, containing 18% of plasticiser | 12 g | 12 g | 12 g | 12 g |
| Pluracol P 1010*. (hydroxylic polyether produced by Kuhlmann) | 10 g | 10 g | 10 g | 10 g |
| Ethyl acetate | 78 g | 78 g | 78 g | 78 g |
| Tolylene di-isocyanate | 4.3 g | 5.6 g | 4.8 g | 5.7 g |
| Total | 104.3 g | 105.6 g | 104.8 g | 105.7 g |

Films of these different lacquers were applied to glass plates and dried for 15 days at ambient temperature.

1. Tests of resistance to solvents

The tests were carried out in the following manner: a drop of coloured solvent was deposited on the film of lacquer and the time which elapsed until the first sign of attack was noted.

Pluracol P 1010 is a dipropylene glycol initiated polyether of average molecular weight 1000, density 1.01 g/cm$^3$ and hydroxyl number 104–115.

| | | Film plasticised with | | |
|---|---|---|---|---|
| Solvent | D.B.P. | Butyl lactate | Tri-butyl citrate | Di-butyl tartrate |
| White spirit | >6 mins. | >6 mins. | >6 mins. | >6 mins. |
| Xylene | >6 mins. | >6 mins. | >6 mins. | >6 mins. |
| Ethyl alcohol | <15 secs.* | 30 secs. | 15 secs.** | 15 secs.** |
| Ethyl acetate | <15 secs.* | 30 secs. | 15 secs.** | 15 secs.** |
| Ethyl glycol acetate | <15 secs.* | 6 mins. | 15 secs.** | 15 secs.** |

*strong coloration of the film
**slight coloration of the film

The penetration of the solvent into the film was noted by the coloration which resulted therefrom.

Butyl lactate provided the best resistance to solvents, whilst butyl tartrate and butyl citrate provided better resistance than that of the control D.B.P.

2. Resistance to migration

A portion of each of the different films was detached from the glass plate and extracted for 24 hours with methylene chloride in a Soxhlet apparatus.

| Films plasticised with: | Test samples | Amount of binder extracted | % of binder extracted | % of plasticiser extracted relating to the test sample |
|---|---|---|---|---|
| D.B.P. | 8 g | 1.99 g | 25% | 9% |
| Butyl lactate | 8 g | 1.01 g | 12.6% | 0.1% |
| Tri-butyl citrate | 8 g | 1.72 g | 21.5% | 8.1% |
| Di-butyl | 8 g | 1.56 g | 19.5% | 7.5% |

| Films plasticised with: | Test samples | Amount of binder extracted | % of binder extracted | % of plasticiser extracted relating to the test sample |
|---|---|---|---|---|
| tartrate | | | | |

In each case, the portion extracted with methylene chloride was subjected to gas phase chromatography in order to determine the amount of plasticiser in it.

The results of the "resistance to migration" tests showed that, especially in the case of the lactate, the plasticiser was less likely to migrate and they confirmed the results of the "resistance to solvents" tests. The plasticisers used according to the invention formed an integral part of the film of lacquer and were rather insensitive to attack by solvents.

We claim:

1. A polyurethane lacquer comprising a polyurethane and a particulate nitrocellulose composition which consists essentially of nitrocellulose and from 10 to 30% by weight, based on the weight of nitrocellulose, of a hydroxylic plasticizer containing at least one free hydroxyl group, said plasticizer being a lower alkyl ester of lactic acid, tartaric acid or citric acid.

2. The lacquer according to claim 1 in which the hydroxylic plasticizer is butyl lactate, di-butyl tartrate, tri-butyl citrate or butyl tartrate.

3. The method of improving the gloss, resistance to solvents and to abrasion and resistance to migration of a polyurethane lacquer which comprises incorporating into said lacquer a particulate nitrocellulose composition which consists essentially of nitrocellulose and from 10 to 30% by weight based on the weight of nitrocellulose, of a hydroxylic plasticizer containing at least one free hydroxyl group, said plasticizer being a lower alkyl ester of lactic acid, tartaric acid or citric acid.

* * * * *